April 11, 1939.   F. N. JACOB   2,153,622

PERMEABILITY TUNED ANTENNA SYSTEM

Filed May 17, 1937

Ferromagnetic Core Having Adjacent Portions Constructed To Produce Increasing High-frequency Losses In Successive Portions As Core Enters Coil.

INVENTOR
FREDERICK N. JACOB
BY Albert C. Bee
ATTORNEY

Patented Apr. 11, 1939

2,153,622

UNITED STATES PATENT OFFICE 2,153,622

PERMEABILITY TUNED ANTENNA SYSTEM

Frederick N. Jacob, Chicago, Ill., assignor to Johnson Laboratories, Inc., Chicago, Ill., a corporation of Illinois Application May 17, 1937, Serial No. 143,016

13 Claims. (Cl. 250—20)

This invention relates to improvements in high-frequency signaling systems, and more particularly to improvements in radio receivers. Specifically, the invention pertains to an improved means for coupling the antenna to a receiver which is adapted to receive signals over a wide range of frequencies.

In general, it is desirable to apply as high a signal voltage as possible to the input circuit of the first thermionic amplifying tube of a radio receiver, in order that the signal-to-noise ratio may be a maximum. Furthermore, it is desirable that the gain of the antenna coupling system remain substantially uniform as the receiver is tuned over a wide range of frequencies, so that the signal-to-noise ratio will be substantially constant. If the receiver includes variably tuned circuits other than the one in the input circuit of the first thermionic amplifying tube, it is highly desirable that means be provided for compensating for variations in the capacitance of the antenna to which the receiver may be connected, in order that the first variably tuned circuit will remain in proper alignment with the other variably tuned circuit of the receiver throughout a wide range of signal frequencies regardless of wide variations in the type of antenna to which the receiver is connected.

In antenna coupling systems of the conventional type, the attainment of high gain is accompanied by a sacrifice in the independence between the antenna capacitance and the alignment of the first variably tuned circuit. Furthermore, if uniform performance over a wide range of frequencies is desired, a substantial sacrifice must be made in the gain of the system. In such systems, the attainment of a high signal-to-noise ratio is incompatible with uniformity of gain and freedom from alignment difficulties. Although this problem is present in all types of radio receivers, it is especially acute in radio receivers intended for use with an antenna of relatively small effective height, as for example, receivers for use in automobiles. In such cases, it is very desirable to make the best possible use of the relatively small signal which is picked up by the antenna, and at the same time provide over-all receiver performance which remains substantially uniform throughout a wide range of frequencies.

It is an object of the present invention, therefore, to provide an antenna coupling system having high gain, which is maintained substantially constant over a wide range of frequencies.

Another object of the invention is to provide an antenna coupling system which has means for compensating for antenna capacitance variations in such a way that the alignment of the first variably tuned circuit of the receiver incorporating the system is not appreciably affected by changes in the antenna capacitance.

A further object of the invention is to provide an improved type of antenna coupling system which is adapted to be tuned over a wide range of frequencies simultaneously with the other variably tuned circuits of the receiver in which the system is employed, in such a manner that the over-all performance of the receiver remains substantially uniform.

The invention will be better understood by reference to the drawing, in which.

Figure 1:
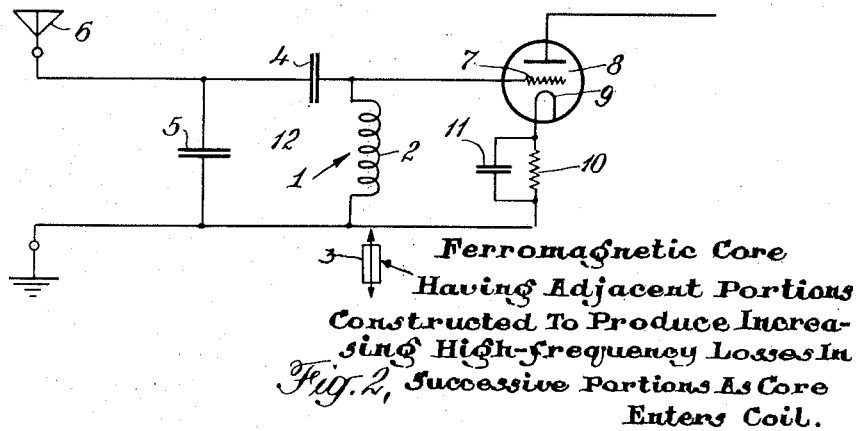
Fig. 1 is the schematic circuit diagram of an antenna system according to the invention.

Referring to Fig. 1 of the drawing, the antenna coupling system comprises variable inductor 1 having coil 2 and movable ferromagnetic core 3, shunted by capacitors 4 and 5 in series. Antenna 6 is connected to the junction of capacitors 4 and 5, and grid 7 of vacuum tube 8 is connected to the ungrounded terminal of inductor 1. Cathode 9 of vacuum tube 8 is grounded through bias resistor 10 shunted by capacitor 11.

In operation, the resonant frequency of circuit 12, comprising inductor 1 and capacitors 4 and 5, is varied by adjustment of variable inductor 1. Circuit 12 may be aligned with the other variably tuned circuits of the receiver by adjustment of capacitor 4, and differences in the capacitance of antenna 6 may be initially and permanently compensated for by adjustment of capacitor 5 without affecting the alignment of circuit 12 with respect to the other circuits.

Figure 2:
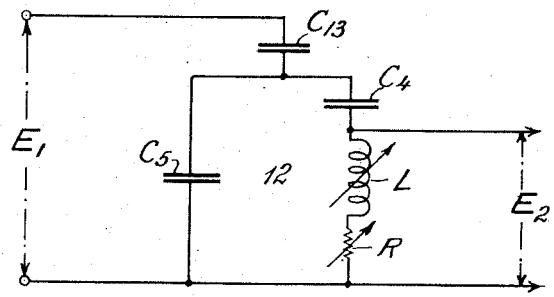
Fig. 2 is the equivalent electrical diagram of the arrangement shown in Fig. 1.

Referring now to Fig. 2 of the drawing, which is the electrical diagram equivalent to Fig. 1, capacitors 4 and 5 of Fig. 1 are represented by reference characters $C_4$ and $C_5$. Variable inductor 1 of Fig. 1 is shown as consisting of inductance $L$ and resistance $R$. Capacitance $C_{13}$ represents the equivalent series capacitance of antenna 6 of Fig. 1. Capacitances $C_4$, $C_5$ and $C_{13}$ are shown as fixed because they do not change as circuit 12 is tuned over the frequency range by means of variable inductor 1. The input voltage is represented by $E_1$, and the output voltage, which is developed across inductor 1, by $E_2$. The ratio $E_2/E_1$ is the voltage step-up or gain of the antenna coupling system.

It may be shown that the gain of the arrangement of Figs. 1 and 2 is expressed to a close approximation as follows:

$$\frac{E_2}{E_1} = (1+jQ)\left(1+\frac{C_5}{C_4}\right) - j\left(Q+\frac{1}{Q}\right)\omega^2 LC_5 \quad (1)$$

where $Q = \omega L/R$. For practical values of Q (greater than 50, for example), the expression $$\left(Q+\frac{1}{Q}\right)$$

is substantially equal to Q, which may therefore be substituted for it. Equation (1) thus becomes:

$$\frac{E_2}{E_1} = (1+jQ)\left(1+\frac{C_5}{C_4}\right) - jQ\omega^2 LC_5 \quad (2)$$

from which, by re-arrangement of some of the terms:

$$\frac{E_2}{E_1} = \left(1+\frac{C_5}{C_4}\right) + jQ\left[1+C_5\left(\frac{1}{C_4}-\omega^2 L\right)\right] \quad (3)$$

Since circuit 12 is tuned by variation of inductance L, the expression $\omega^2 L$ is a constant throughout the frequency range, and may be replaced by the value K, so that Equation (3) becomes:

$$\frac{E_2}{E_1} = \left(1+\frac{C_5}{C_4}\right) + jQ\left[1+C_5\left(\frac{1}{C_4}-K\right)\right] \quad (4)$$

The magnitude of this ratio is $$\frac{E_2}{E_1} = \sqrt{\left(1+\frac{C_5}{C_4}\right)^2 + Q^2\left[1+C_5\left(\frac{1}{C_4}-K\right)\right]^2} \quad (5)$$

from which it is evident that the gain varies as does Q. If Q is maintained constant as the circuit is tuned, the gain will be constant also, since none of the terms of Equation (5) is changed by the variation of L.

Referring to Figure 1, it will be understood that the antenna 6 may be connected to the junction of capacitor 5 and inductor 1, and the ground and cathode may be connected to the junction of capacitors 4 and 5. In this arrangement the input capacitance of vacuum tube 8 is not present across inductor 1 and a higher effective Q value for the inductor 1 can therefore be realized. However, the inductor 1 will be at considerable radio-frequency potential above ground, and this makes it disadvantageous to ground the ferromagnetic core 3. If the core 3 is not grounded, the small additional capacitance variation between a grounded core and a coil will not be present and a core having a slightly higher effective permeability must be employed.

In order to maintain Q constant as the frequency is varied, the total resistance R of inductor 1 must vary inversely as the first power of frequency. This is evident from the expression $$Q = \frac{\omega L}{R}, \text{ where } \omega = 2\pi f$$

since $\omega$ increases as the first power of frequency and L is inversely proportional to the second power of frequency. The relations of Q, L and R to frequency for a particular device are shown in Fig. 3, by the curves marked Q, L and R, respectively.

The coil and the ferromagnetic core, which together form the variable inductor used for tuning over a range of frequencies, must be so designed as to co-operatively produce the desired relation between total resistance and frequency. In variable inductors of the type herein contemplated, the inductance is increased by moving the core farther into the coil. The frequency decreases as the core is moved into the coil, but the resistance increases due to the core. Thus an inverse relation between resistance and frequency is inherent in variable inductors of this type. It remains only to so design the core that, when used with a given coil, the resistance due to it varies as the proper function of frequency.

Figure 3:
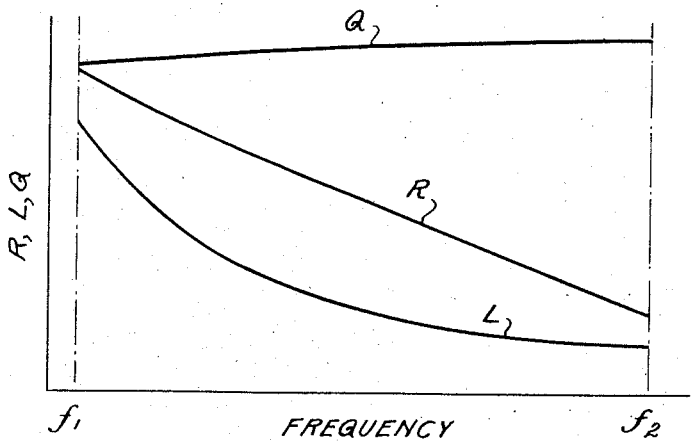
Fig. 3 is a graph indicating certain properties of the arrangement shown in Fig. 1.

Referring to Fig. 3, let us consider the conditions which exist at the extreme high-frequency end of the tuning range, denoted by $f_2$. At this setting, the ferromagnetic core is completely withdrawn from the coil. It is the values of L and R at $f_2$ that determine the value of Q which is to be maintained substantially unchanged throughout the frequency range. By proper design of the coil, this value may be made relatively high, so that the gain of the antenna coupling system will be sufficient to provide a high ratio of signal to noise.

As the ferromagnetic core is gradually inserted, the total resistance R should increase inversely as the first power of frequency, the inductance L increasing inversely as the second power of frequency, in order that Q may remain substantially constant. Most of the resistance of the inductor is due to the core at the low-frequency end of the tuning range, denoted by $f_1$, when the core is completely inserted. This provides a second design point for the inductor, the core being so chosen as to provide the correct total resistance at this frequency.

Various expedients may be employed to obtain the proper relation between the resistance due to the ferromagnetic core and frequency at intermediate points in the tuning range. It is preferable to employ a solenoidal coil which is long relatively to its diameter, so that substantial movement of the core is required to tune the circuit over the required range of frequencies. In general, at any given setting the resistance due to the core is roughly proportional to the inductance increase due to the core. Consequently, by properly designing the core, it is possible to realize the desired relation between the resistance due to the core and frequency.

The design of a suitable ferromagnetic core involves several factors which are not entirely independent of each other. These factors include the shape of the core, the type and distribution of ferromagnetic material employed, and the kind of particle insulation and binder used. From the manufacturing standpoint, it is desirable that the core be of cylindrical or uniformly tapered form, and preferably of homogeneous magnetic density. In order to obtain the desired characteristics, however, it is usually necessary to alter either the mechanical or magnetic design slightly from the optimum commerical form.

In one successful embodiment, by way of illustrative example, a three-bank winding of 15/44 Litz wire and 1.625 inches long by 0.34 inch in diameter is employed, the ferromagnetic core being cylindrical and 0.3125 inch in diameter by 1.875 inches long. The third of the core which enters the coil first is made of very finely divided low-loss ferromagnetic material, so that the losses at the high-frequency end of the tuning range are kept at a very low value. The remainder of the core is made of somewhat coarser and less expensive ferromagnetic material having somewhat higher losses, since it is necessary that the resistance due to the core increase appreciably as the frequency is decreased.

The above-described coil has an air-core inductance of about 200 microhenries and a Q of about 132 at 1500 kilocycles per second, and this value of Q is maintained substantially constant throughout the tuning range. Referring to Fig. 1 of the drawing, if capacitor 4 has a value of 80 micromicrofarads and antenna 6 has a capacitance of 200 micromicrofarads, the voltage gain approaches a theoretical maximum of about 30 times. The actual gain is somewhat below this maximum value, but is nevertheless substantially better than is obtained with present-day systems.

It will be understood that the invention is not limited in scope to the particular embodiment just described, and that various modifications which will occur to those skilled in the art are contemplated, the scope of the invention being defined by the following claims.

Having thus described my invention, what I claim is:

1. A high-frequency network including a parallel resonant circuit, an antenna connected to said circuit, and a ferromagnetic core movable relatively to an inductive element in said circuit, said core having its inductance-increasing content and its resistance-increasing content varying sufficiently throughout its length to maintain the ratio of inductive reactance to effective resistance in said circuit substantially constant while tuning said circuit over a range of frequencies.

2. A high-frequency network including a parallel resonant circuit, an antenna connected to said circuit, and a ferromagnetic core movable relatively to an inductive element in said circuit, said core having its inductance-increasing content and its resistance-increasing content varying sufficiently throughout its length to maintain the effective inductance in said circuit substantially proportional to the square of the effective resistance in said circuit while tuning said circuit over a range of frequencies.

3. A high-frequency network including a parallel resonant circuit, an antenna connected to said circuit, and a ferromagnetic core movable relatively to an inductive element in said circuit, said core having its inductance-increasing content and its resistance-increasing content varying sufficiently throughout its length to maintain the resonant gain in said circuit substantially constant while tuning said circuit over a range of frequencies.

4. A high-frequency network including a parallel resonant circuit, an antenna connected to said circuit, and a ferromagnetic core movable relatively to an inductive element in said circuit, said core having its inductance-increasing content and its resistance-increasing content varying sufficiently throughout its length so that the ratio of the voltage developed in said antenna by a radio signal to the voltage developed across said inductive element when said circuit is tuned by said core to resonance with said signal is substantially constant throughout the range of frequencies to which said circuit may be tuned.

5. A high-frequency network including a variable inductive element and two adjustable capacitive elements connected to form a parallel resonant circuit, an antenna connected to a junction of said capacitive elements, a connection from the junction of said inductive element and one of said capacitive elements to ground, and a ferromagnetic core movable relatively to said inductive element to tune said circuit over a range of frequencies, said core having its inductance-increasing content and its resistance-increasing content varying sufficiently throughout its length to maintain the ratio of the inductive reactance to the resistance of said circuit substantially constant, whereby the ratio of voltage generated in said antenna circuit to the voltage generated across said inductive element at the resonant frequency of said circuit is maintained substantially constant throughout said tuning range.

6. A high-frequency network including an inductive element having appreciable resistance and capacitive elements having negligible resistance connected to form a parallel resonant circuit, an antenna connected to the junction of said capacitive elements, and means including a ferromagnetic core movable relatively to said inductive element for simultaneously varying the inductance and the resistance of said inductive element to tune said circuit over a range of frequencies, said core having its inductance-increasing content and its resistance-increasing content varying sufficiently throughout its length to maintain the ratio of the inductive reactance to the resistance of said circuit substantially constant.

7. A high-frequency network including an inductive element and two capacitive elements connected in series to form a resonant circuit, an antenna connected to the junction of said capacitive elements, a connection from the junction of said inductive element and one of said capacitive elements to ground, a vacuum tube having a grid and a cathode, a connection from the junction of said inductive element and the other of said capacitive elements to said grid, a path from ground to said cathode, and a ferromagnetic core movable relatively to said inductive element, said core having its inductance-increasing content and its resistance-increasing content varying sufficiently throughout its length so that movement of said core simultaneously varies the inductance and the resistance of said inductive element in such a way as to maintain the ratio of the resonant inductive reactance to the resistance of said circuit substantially constant.

8. A high-frequency network including an inductive element and two capacitive elements connected in series to form a resonant circuit, an antenna connected to the junction of said capacitive elements, a connection from the junction of said inductive element and one of said capacitive elements to ground, a vacuum tube having a grid and a cathode, a connection from the junction of said inductive element and the other of said capacitive elements to said grid, a path from ground to said cathode, and a ferromagnetic core movable relatively to said inductive element, said core having adjacent portions constructed to produce increasing high-frequency losses in successive portions as said core enters said inductive element, whereby movement of said core simultaneously varies the inductance and the resistance of said inductive element in such a way as to maintain the ratio of the resonant inductive reactance to the resistance of said circuit substantially constant.

9. A high-frequency network including an inductive element and two capacitive elements connected in series to form a resonant circuit, an antenna connected to the junction of said capacitive elements, a connection from the junction of said inductive element and one of said capacitive elements to ground, a vacuum tube having a grid and a cathode, a connection from the junction of said inductive element and the other of said capacitive elements to said grid, a path from ground to said cathode, and a ferromagnetic core movable relatively to said inductive element, said core being in the form of a rod, that portion which first enters said inductive element being of relatively low inherent high-frequency losses and the remainder being of relatively high inherent high-frequency losses, whereby movement of said core simultaneously varies the inductance and the resistance of said inductive element in such a way as to maintain the ratio of the resonant inductive reactance to the resistance of said circuit substantially constant.

10. A high-frequency network including a variable inductive element and two adjustable capacitive elements connected to form a parallel resonant circuit, an antenna connected to the junction of a first and a second of said elements, a connection from the junction of said second and the third element to ground, and a ferromagnetic core movable relatively to said inductive element to tune said circuit over a range of frequencies, said core having its inductance-increasing content and its resistance-increasing content varying sufficiently throughout its length to maintain the ratio of the inductive reactance to the resistance of said circuit substantially constant, whereby the ratio of voltage generated in said antenna circuit to the voltage generated across said third element at the resonant frequency of said circuit is maintained substantially constant throughout said tuning range.

11. A high-frequency network including an inductive element and two capacitive elements connected in series to form a resonant circuit, an antenna connected to the junction of a first and a second of said elements, a connection from the junction of said second and the third element to ground, a vacuum tube having a grid and a cathode, a connection from the junction of said first and third elements to said grid, a path from ground to said cathode, and a ferromagnetic core movable relatively to said inductive element, said core having its inductance-increasing content and its resistance-increasing content varying sufficiently throughout its length so that movement of said core simultaneously varies the inductance and the resistance of said inductive element in such a way as to maintain the ratio of the resonant inductive reactance to the resistance of said circuit substantially constant.

12. A high-frequency network including an inductive element and two capacitive elements connected in series to form a resonant circuit, an antenna connected to the junction of a first and a second of said elements, a connection from the junction of said second and the third element to ground a vacuum tube having a grid and a cathode, a connection from the junction of said first and third elements to said grid, a path from ground to said cathode, and a ferromagnetic core movable relatively to said inductive element, said core having adjacent portions constructed to produce increasing high-frequency losses in successive portions as said core enters said inductive element, whereby movement of said core simultaneously varies the inductance and the resistance of said inductive element in such a way as to maintain the ratio of the resonant inductive reactance to the resistance of said circuit substantially constant.

13. A high-frequency network including an inductive element and two capacitive elements connected in series to form a resonant circuit, an antenna connected to the junction of a first and a second of said elements, a connection from the junction of said second and the third element to ground, a vacuum tube having a grid and a cathode, a connection from the junction of said first and third elements to said grid, a path from ground to said cathode, and a ferromagnetic core movable relatively to said inductive element, said core being in the form of a rod, that portion which first enters said inductive element being of relatively low inherent high-frequency losses and the remainder being of relatively high inherent high-frequency losses, whereby movement of said core simultaneously varies the inductance and the resistance of said inductive element in such a way as to maintain the ratio of the resonant inductive reactance to the resistance of said circuit substantially constant.

FREDERICK N. JACOB.

---

CERTIFICATE OF CORRECTION.

Patent No. 2,153,622.            April 11, 1939.

FREDERICK N. JACOB.

It is hereby certified that error appears in the printed specification of the above numbered patent requiring correction as follows: Page 2, first column, lines 18 and 19, in the equation, for $$"\ \frac{E_2}{E_1}\ -\ " \quad \text{read} \quad \frac{E_2}{E_1} = \ ;$$

same page and column, lines 30 and 31, in the equation, for $$"\ [1 + c^5\ " \quad \text{read} \quad [1 + c_5 \ ;$$

and that the said Letters Patent should be read with this correction therein that the same may conform to the record of the case in the Patent Office.

Signed and sealed this 13th day of June, A. D. 1939.

Henry Van Arsdale (Seal)            Acting Commissioner of Patents.